Patented Apr. 1, 1924.

1,488,481

UNITED STATES PATENT OFFICE.

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

REGENERATION OF STORAGE-BATTERY ELEMENTS.

No Drawing.     Application filed April 26, 1922. Serial No. 556,759.

*To all whom it may concern:*

Be it known that I, THOMAS A. EDISON, a citizen of the United States, and a resident of Llewellyn Park, West Orange, Essex County, New Jersey, have invented certain new and useful Improvements in Regeneration of Storage-Battery Elements, of which the following is a description.

My invention relates to the regeneration of storage battery elements and more particularly to the regeneration of the positive electrode elements of storage battery cells of the Edison type in which an alkaline electrolyte is employed, and in the preferred form of which the active material of the positive elements comprises nickel hydrate, usually comprising several different hydroxides of nickel and the active material of the negative elements comprises electrolytically active iron or oxides of iron.

Edison storage battery cells as usually constructed comprise alternately arranged positive and negative plates separated and insulated from each other, each of the plates comprising a steel grid carrying a plurality of perforated pockets or tubes with the active material tightly packed therein. In the case of the positive plates, the perforated tubes contain alternate layers of hydroxides of nickel as the active material, and metallic nickel flake, the layers of nickel flake merely serving as conductors between the adjacent layers of the active material. In new cells prior to the first charging, this active material consists of nickel hydroxide in the lowest or first stage of oxidation, that is, in the nickelous state. Upon charging such cells, this nickelous hydroxide first goes to another and higher state of oxidation and finally to a still higher state of oxidation, being then in the form of hydrated peroxides of nickel, or what may be termed the nickelic state. On discharging the cells, however, the active material of the positive elements never returns to the lowest or first stage of oxidation or to the nickelous state, but is merely reduced from higher to lower hydroxides. The active material of the positive elements of an Edison cell is the depolarizing material, and when such a cell is charged the active material of the negative elements is changed to metallic iron, while upon discharging of the cell this iron is oxidized. When an Edison cell has been in operation for a very long period, however, it is frequently found that the active material of the positive electrode elements will no longer act as an efficient depolarizer for the active material of the negative electrode elements. This condition is due in a large measure to the fact that impurities and foreign matter gradually accumulate on and in the positive elements, and eventually the tubes carrying the active material, and also the active material and the layers of metallic flake nickel disposed between the layers of such active material, becor e coated with a scale or crust which seriously impairs the efficient operation of the cell. In this connection it may be noted that when the layers of metallic flake nickel become thus coated, they will no longer act as efficient conductors between the superposed layers of the nickel hydrate. The loss of efficiency thus caused is especially pronounced in the case of cells not properly cared for, as where distilled water has not been used in replenishing the electrolyte. Moreover, in the continued use of an Edison cell a small amount of the electrolytically active iron and iron oxide of the negative electrode elements is gradually carried from the latter by the electrolyte and slowly deposited on and in the positive elements, which also results in impairing the efficiency of the cell. In my copending application, Serial No. 503,970, filed Sept. 28, 1921, I have described a process for regenerating the nickel hydrate and nickel flake of the positive electrode elements of Edison storage battery cells without removing these materials from the perforated pockets or tubes. However, where the capacity of Edison storage battery cells has fallen to a very low point and where the material in the tubes or pockets of the positive elements of such cells has been dried and has caked into very hard masses or pencils as, for example, where the elements are exposed to the air for a long period, it is frequently impossible to effectively and efficiently regenerate the nickel hydrate and nickel flake by the process forming the subject-matter of my said copending application, and the principal object of the present invention resides in a process for effectively regenerating the nickel hydrate and nickel flake in such cases. In some aspects the invention described herein is an improvement on that disclosed in such coopending application.

In regenerating the layers of active material and nickel flake in the tubes of the positive elements of Edison storage battery cells in accordance with the present invention, I first split these tubes and remove the caked pencils of active material and nickel flake therefrom. These caked pencils are then softened sufficiently to enable the nickel hydrate and the nickel flake to be readily separated by washing, the softening preferably being accomplished by subjecting the pencils to the action of a 20% solution of hyposulphite of soda for a considerable period of time, usually in the neighborhood of twenty-four hours. The nickel hydrate is preferably separated from the nickel flake by washing the same out of the softened pencils through a screen the holes of which are much smaller than the nickel flake, water being used to wash out the nickel hydrate. The nickel hydrate thus separated from the nickel flake is washed free of all hyposulphite of soda and then subjected to the action of a slightly alkaline solution of a suitable reducing agent. Any of the usual reducing agents may be employed such as glycerine, glucose, a tartrate, or any sugar, although I prefer to use glycerine as I find the same to be the most practical and efficient material, and that the best results are obtained by employing an approximately 10% solution of glycerine in water containing approximately 1% of an alkali such, for example, as caustic soda. The alkaline solution of glycerine is constantly maintained at the boiling point and the nickel hydrate is kept in and subjected to the action of this boiling solution until it is completely reduced to the green hydroxide, that is, to nickel hydroxide in the lowest or first stage of oxidation or the nickelous state. I preferably keep the nickel hydrate in this boiling solution for a period somewhat longer than necessary to reduce all the hydrate to the nickelous state, in order to remove lime and other compounds and foreign matter deposited in the mass of nickel hydrate from the water added to the electrolyte of the cell while the latter was in service. The reduced nickel hydrate is then removed from the alkaline solution of glycerine or other reducing agent and is washed free from such reducing agent by subjecting the same to the action of fresh water rendered very slightly alkaline, preferably to a solution of approximately $\frac{1}{10}$ of 1% of an alkali such as caustic soda. The nickel hydrate is kept in this solution, which is constantly maintained at the boiling point, until all the reducing agent is completely removed. The nickel hydrate, now in the nickelous state, is then removed from the weak solution of caustic soda or other alkali and may be and preferably is subjected to the action of a solution of a strong acid, preferably a 30% solution of hydrochlorine acid, for a short time so as to remove therefrom any remaining impurities and foreign matter including iron and iron oxide, which may have been deposited from the electrolyte of the cell. The reduced nickel hydrate is then removed from the solution of hydrochloric acid, washed free from such acid by water and then dried at about 212° Fahrenheit after which it is in a condition to be used over again in manufacturing new tubes for the positive elements of Edison storage battery cells.

The nickel flake separated from the nickel hydrate as above described, is suitably treated separately from the nickel hydrate so as to remove therefrom iron and other incrustations, preferably by immersing the same in an approximately 30% solution of hydrochloric acid and subjecting it to the action thereof for a period of about five minutes. The nickel flake is then removed from the hydrochloric acid solution, is washed free from hydrochloric acid and dried. The nickel flake thus regenerated is now ready to be used again with the regenerated nickel hydrate or with other nickel hydrate in the nickelous state, in making new tubes for the positive elements of Edison storage battery cells.

While I have described the preferred manner of carrying out my improved process, it is to be understood that the same is subject to various changes and modifications without departure from the spirit of the invention and the scope of the appended claims.

Having now described my invention, what I claim as new and desire to protect by Letters Patent is as follows:

1. The process which consists in softening the mass of nickel hydrate and nickel of a positive element of a storage battery cell of the Edison type, then separating the nickel hydrate from the nickel, and then separately regenerating said nickel hydrate and nickel, substantially as described.

2. The process which consists in separating the nickel hydrate and nickel of a positive element of a storage battery cell of the Edison type, and then separately regenerating said nickel hydrate and nickel, substantially as described.

3. The process which consists in softening the mass of nickel hydrate and nickel of a positive element of a storage battery cell of the Edison type by subjecting said mass to the action of a solution of hyposulphite of soda, and then separating said nickel hydrate and nickel, substantially as described.

4. The process which consists in softening the mass of nickel hydrate and nickel of a positive element of a storage battery cell of the Edison type, and then separating said nickel hydrate and nickel by washing the nickel hydrate from the softened mass, substantially as described.

5. The process which consists in softening the mass of nickel hydrate and nickel of a positive element of a storage battery cell of the Edison type, and then separating said nickel hydrate and nickel by washing the nickel hydrate from the softened mass through a screen the holes in which are smaller than the particles of nickel in said mass, substantially as described.

6. The process which consists in removing from a positive element of a storage battery cell of the Edison type the mass of nickel hydrate and flake nickel carried thereby, softening said mass by subjecting the same to the action of a solution of hyposulphite of soda, and then separating the nickel hydrate and flake nickel by washing the nickel hydrate from the softened mass through a screen the holes in which are smaller than the nickel flake, substantially as described.

7. The process which consists in separating the nickel hydrate and nickel of a positive element of a storage battery cell of the Edison type, and then regenerating said nickel by subjecting the same to the action of an acid substantially as described.

8. The process which consists in separating the nickel hydrate and nickel of a positive element of a storage battery cell of the Edison type, and then regenerating said nickel by subjecting the same to the action of an approximately 30% solution of hydrochloric acid, substantially as described.

9. The process which consists in separating the nickel hydrate and nickel of a positive element of a storage battery cell of the Edison type, and then regenerating said nickel hydrate by successively subjecting the same to the action of a solution of a reducing agent and to the action of a weak alkaline solution, substantially as described.

10. The process which consists in softening the mass of nickel hydrate and nickel of a positive element of a storage battery cell of the Edison type by subjecting the same to the action of a solution of hyposulphite of soda, separating said nickel hydrate and nickel by washing the nickel hydrate out of the softened mass, washing the nickel hydrate thus separated free of hyposulphite of soda, and then reducing the nickel hydrate to the first oxidation stage, substantially as described.

11. The process which consists in separating the nickel hydrate and nickel of a positive element of a storage battery cell of the Edison type, and then regenerating said nickel hydrate by successively subjecting the same to the actions of a reducing agent, a weak alkaline solution, and an acid, substantially as described.

12. The process which consists in separating the nickel hydrate and nickel of a positive element of a storage battery cell of the Edison type, then subjecting said nickel hydrate to the action of a solution of a reducing agent for a period somewhat longer than that necessary to effect the reduction of such nickel hydrate to the first oxidation stage, and then subjecting the reduced nickel hydrate to the action of a weak alkaline solution, substantially as described.

13. The process which consists in separating the nickel hydrate and nickel of a positive element of a storage battery cell of the Edison type, then subjecting said nickel hydrate to the action of a boiling solution of a reducing agent, and then subjecting the reduced nickel hydrate to the action of a weak alkaline solution, substantially as described.

This specification signed this 25th day of April, 1922.

THOS. A. EDISON.